(12) United States Patent
Park et al.

(10) Patent No.: US 9,612,692 B2
(45) Date of Patent: Apr. 4, 2017

(54) POSITION MEASURING APPARATUS AND DRIVING METHOD THEREOF

(71) Applicant: Samsung Electronics Co., Ltd., Gyeonggi-do (KR)

(72) Inventors: Sung-Soo Park, Gyeonggi-do (KR); Yu-Sheop Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 511 days.

(21) Appl. No.: 13/859,340

(22) Filed: Apr. 9, 2013

(65) Prior Publication Data

US 2013/0265279 A1 Oct. 10, 2013

(30) Foreign Application Priority Data

Apr. 10, 2012 (KR) .................. 10-2012-0037372

(51) Int. Cl.
  *G06F 3/044* (2006.01)
(52) U.S. Cl.
  CPC .... *G06F 3/044* (2013.01); *G06F 2203/04103* (2013.01)
(58) Field of Classification Search
  CPC .............................. G06F 3/0416; G06F 3/044
  See application file for complete search history.

(56) References Cited

U.S. PATENT DOCUMENTS

| 5,648,642 | A | 7/1997 | Miller et al. | |
|---|---|---|---|---|
| 7,911,456 | B2 | 3/2011 | Gillespie et al. | |
| 8,217,902 | B2 * | 7/2012 | Chang | G06F 3/044 324/661 |
| 2008/0309631 | A1 | 12/2008 | Westerman et al. | |
| 2009/0167713 | A1 * | 7/2009 | Edwards | G06F 3/0416 345/173 |
| 2009/0283342 | A1 * | 11/2009 | Schediwy | G06F 3/044 178/19.03 |
| 2012/0242612 | A1 * | 9/2012 | Chang | G06F 3/044 345/174 |

FOREIGN PATENT DOCUMENTS

| KR | 19990064226 | 7/1999 |
|---|---|---|
| KR | 1020090048770 | 5/2009 |

* cited by examiner

*Primary Examiner* — Benjamin C Lee
*Assistant Examiner* — Xuemei Zheng
(74) *Attorney, Agent, or Firm* — The Farrel Law Firm, P.C.

(57) ABSTRACT

A method and a position measuring apparatus that measures a position of a touch by an object on a device including the position measuring apparatus using an electrode unit for sensing a capacitance or voltage variation caused by a touch of the object and a control circuit unit for exchanging electrical signals with the electrode unit are provided. The method includes sensing a touch signal of the object on an independent channel connected to the control circuit unit through an independent connector; selectively driving a multi-channel disposed adjacent to the independent channel and electrically connected to the control circuit through a common connector, in response to the touch signal applied on the independent channel; and sensing the touch signal of the object using the multi-channel.

9 Claims, 12 Drawing Sheets

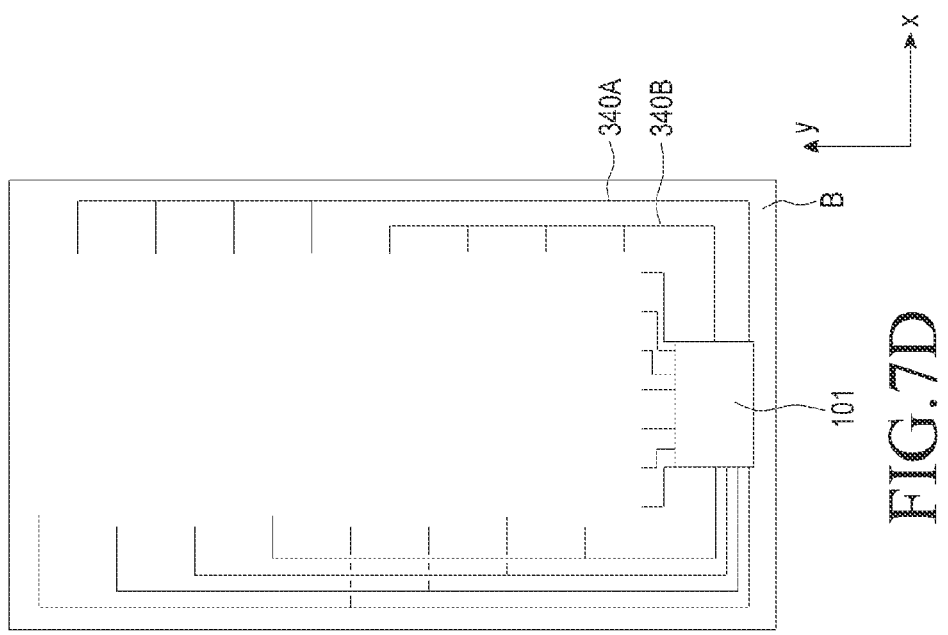
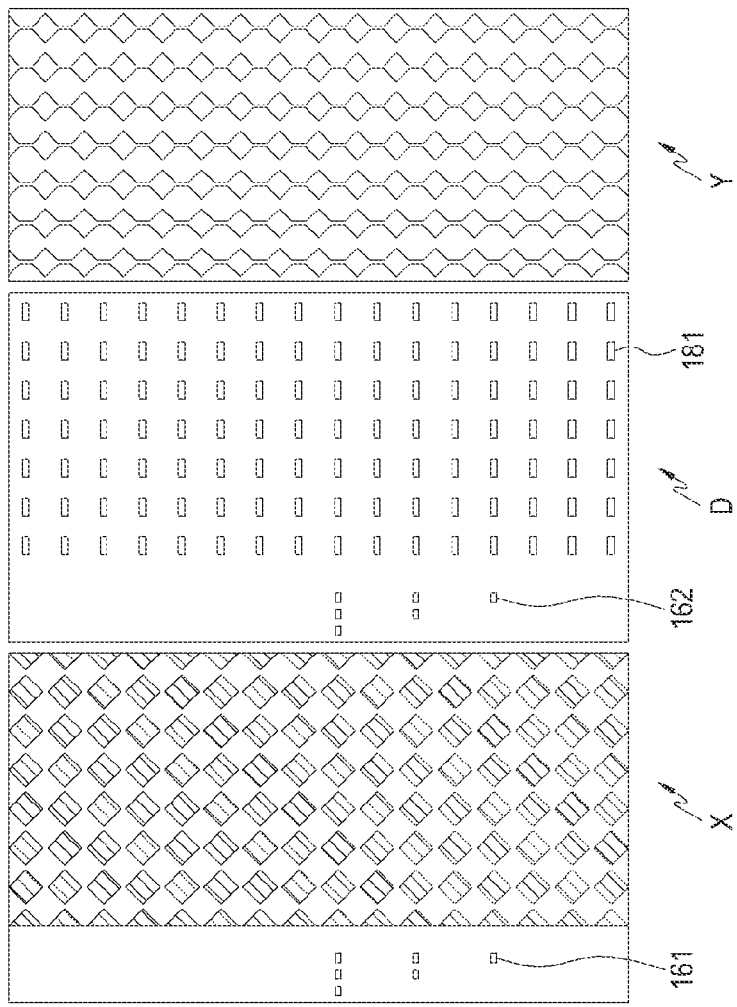
FIG.7A  FIG.7B  FIG.7C  FIG.7D

POSITION MEASURING APPARATUS AND DRIVING METHOD THEREOF

PRIORITY

This application claims priority under 35 U.S.C. §119(a) to a Korean Patent Application filed in the Korean Intellectual Property Office on Apr. 10, 2012 and assigned Serial No. 10-2012-0037372, the entire content of which is incorporated herein by reference.

BACKGROUND OF THE INVENTION

1. Field of the Invention

The present invention relates generally to a position measuring apparatus, and more particularly, to a position measuring apparatus for realizing a high touch resolution and a driving method thereof.

2. Description of the Related Art

In general, a tablet Personal Computer (PC) or a portable terminal such as a navigator, a Personal Digital Assistant (PDA), a Moving Picture Experts Group Audio Layer-3 (MP3) player, a Portable Multimedia Player (PMP), or an e-book reader is equipped with a touch panel. Touch panels in such devices include resistive touch panels, capacitive touch screens, ultrasonic touch panels, and infrared touch panels, for example. Among these types of touch panels, the resistive touch panel and the capacity touch panel are popular. Resistive touch panels have decreased light transmission through a display compared to other types of touch panels, due to reflection from an air gap between Indium Tin Oxide (ITO) layers within the resistive touch panels. Resistive touch panels also cause an increased fatigue of a user's eyes compared to other types of touch panels, due reflection of outside light from the surface of resistive touch panels.

Compared to the resistive touch panel, the capacitive touch panel provides excellent durability and light transmission, and therefore, use of capacitive touch panels has recently become widespread. Conventional technologies regarding capacitive touch panels are included in Korean Patent Application Publication No. 10-1999-0064226 (published on Jul. 26, 1999), International Application No. PCT/US1996/17862, and Korean Patent Application Publication No. 10-2009-0048770 (published on May 15, 2009).

FIG. 1 is a simplified diagram illustrating a structure of a conventional position measuring apparatus.

Referring to FIG. 1, a touch panel includes an electrode pattern 10 with equally spaced channels arranged in one direction on a substrate (not shown), a driving chip 13 for sensing a touched position when a channel 11 is touched, and connection electrodes 12 for connecting the channels 11 to the driving chip 13. The electrode pattern 10 is formed by depositing a transparent conductive material (not shown) having uniform resistive components (not shown), such as ITO, to a uniform thickness on a substrate by, for example, vapor deposition. The substrate is generally a transparent film or glass on which an electrode pattern formed of a material such as ITO can be deposited. The electrode pattern includes X-axis grid channels (X-grid channels) and Y-axis grid channels (Y-grid channels) so as to detect a two-dimensional touched position. The connection electrodes 12 are individually formed at both sides of the channels 11 in order to connect the channels 11 to the driving chip 13.

A user touches a keyboard or an icon displayed on a touch panel having the electrode pattern 10 in a terminal with the user's finger or a conductive pen capable of touching a small area, such as a stylus pen, for example. Specifically, when the user touches a screen displayed on a display panel with the finger or the conductive pen, a variation occurs to the capacitance of X-grid and Y-grid channels arranged at the touched position. The capacitance variation is applied to the driving chip 13 via a connection electrode 12 at the touched position and the driving chip 13 detects position information, thus determining the touched position.

As illustrated in FIG. 1, for six channels 11, six connection electrodes 12 are provided. To increase a touch resolution of the touch panel of FIG. 1, the number of channels 11 must be increased. However, the increased number of channels 11 in turn increases the number of connection electrodes 12 that connect the channels 11 to the driving chip 13. As a result, the connection electrodes 12 occupy more space. The connection electrodes 12 are arranged at both sides of the channels 11 to prevent interference with a display area. As the connection electrodes 12 are arranged over a larger area, the peripheral area of the display screen is widened.

FIG. 2 is a simplified diagram illustrating another conventional position measuring apparatus in which a number of sensing electrodes is doubled in order to double a touch resolution in comparison to the conventional position measuring apparatus illustrated in FIG. 1.

Referring to FIG. 2, if the number of channels 11 of the touch panel of FIG. 1 is increased to 12 in order to double a touch resolution, the number of connection electrodes 12 of the touch panel of FIG. 1 is also increased to 12. Consequently, in the touch panel of FIG. 2, additional space for the additional connection electrodes 12 is required, thereby increasing the total installation space of all of the connection electrodes 12. The edges of the touch panel must also be widened by an amount corresponding to the installation space of the added connection electrodes 12. The increased width of the edges of a touch panel reduces the favorable aesthetics of a portable terminal having the touch panel according to FIG. 2 in comparison to aesthetics of a terminal having a touch panel according to FIG. 1.

In addition, the increased the number of connection electrodes 12 in FIG. 2 also corresponds to an increased size of the driving chip 13 that controls the connection electrodes 12, which is unfavorable in terms of installation space and fabrication cost.

SUMMARY OF THE INVENTION

An aspect of the present invention is to address at least the above-described problems and/or disadvantages and to provide at least the advantages described below. Accordingly, an aspect of the present invention is to provide a position measuring apparatus for realizing a high touch resolution by increasing the number of channels to accurately sense even a position touched by an object having a small touch area and minimizing the installation space of connection electrodes by minimizing the number of connection electrodes that connect the channels to a driving chip, and a driving method thereof in an apparatus capable of sensing a touched position like a touch panel.

In accordance with an aspect of the present invention, an apparatus for measuring a position of a touch by an object on a device included the apparatus is provided. The apparatus includes an electrode unit for sensing a capacitance or voltage variation caused by a touch of the object; a control circuit unit for exchanging electrical signals with the electrode unit, sensing electrodes included in the electrode unit and formed in two crossing directions for sensing a touch of the object on a plane; connectors included in the electrode unit for electrically connecting the sensing electrodes to the control circuit unit, and independent channels connected to independent connectors among the connectors, which are included in the electrode unit for sensing electrodes arranged in at least one of the two crossing directions, the independent connectors connecting a part of the sensing electrodes independently to the control circuit unit; and multi-channels included in the electrode unit and connected to common connectors among the connectors, the common connectors connecting the other part of the sensing electrodes commonly to the control circuit unit In accordance with another aspect of the present invention, an apparatus for measuring a position of a touch by an object on a device including the apparatus is provided. The apparatus includes an electrode unit for sensing a capacitance or voltage variation caused by the touch of the object; a control circuit unit for exchanging electrical signals with the electrode unit; sensing electrodes included in the electrode unit for sensing a touch of the object, and connectors for electrically connecting the sensing electrodes to the control circuit unit; and a plurality of multi-channels included in the electrode unit and electrically connected to the control circuit unit through the connectors electrically connected to the sensing electrodes, wherein each of the multi-channels includes a region distinguishing channel for defining a region and a fine position measuring channel for measuring a fine position and only one sensing electrode of the fine position measuring channel is interposed between a plurality of sensing electrodes of the region distinguishing channel.

In accordance with another aspect of the present invention, a method for driving a position measuring apparatus that measures a position of a touch by an object on a device including the position measuring apparatus, the position measuring apparatus using an electrode unit for sensing a capacitance or voltage variation caused by a touch of the object and a control circuit unit for exchanging electrical signals with the electrode unit is provided. The method includes sensing a touch signal of the object on an independent channel connected to the control circuit unit through an independent connector; selectively driving a multi-channel disposed adjacent to the independent channel and electrically connected to the control circuit through a common connector, in response to the touch signal applied on the independent channel; and sensing the touch signal of the object using the multi-channel.

BRIEF DESCRIPTION OF THE DRAWINGS

The above and other objects, features and advantages of certain aspects of the present invention will be more apparent from the following detailed description taken in conjunction with the accompanying drawings, in which:

FIGS. 7A through 7D are simplified diagrams illustrating the configuration of the position measuring apparatus illustrated in FIG. 6;

DETAILED DESCRIPTION OF EMBODIMENTS OF THE INVENTION

Figure 1:
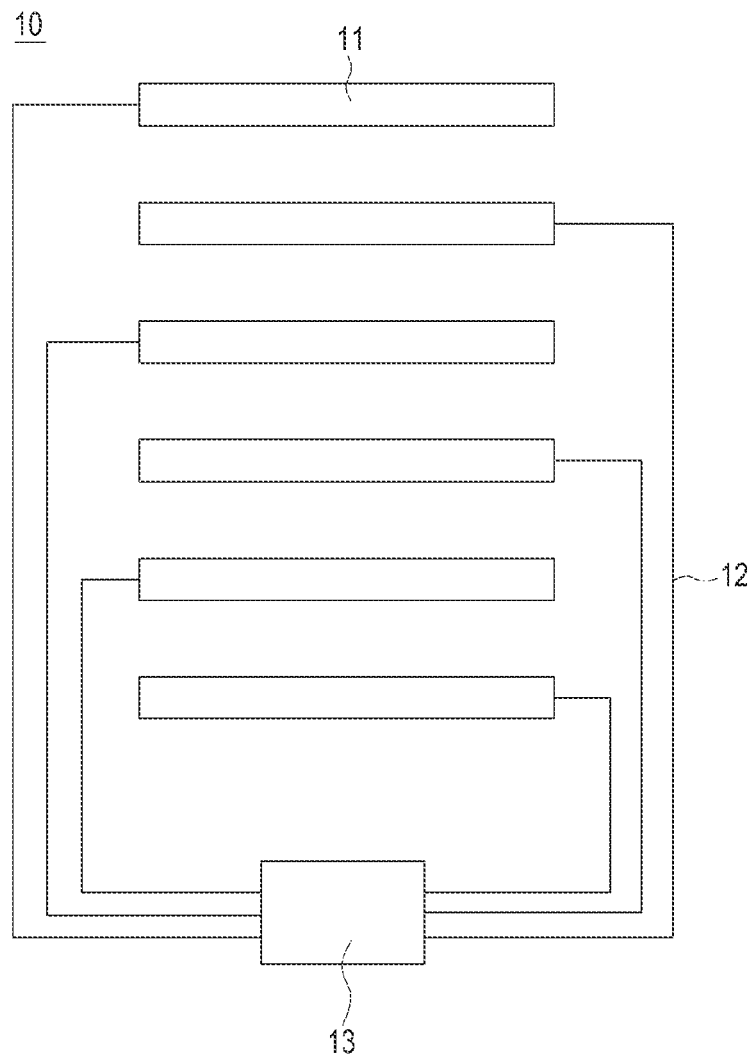
FIG. 1 is a simplified diagram illustrating a conventional position measuring apparatus.
Figure 2:
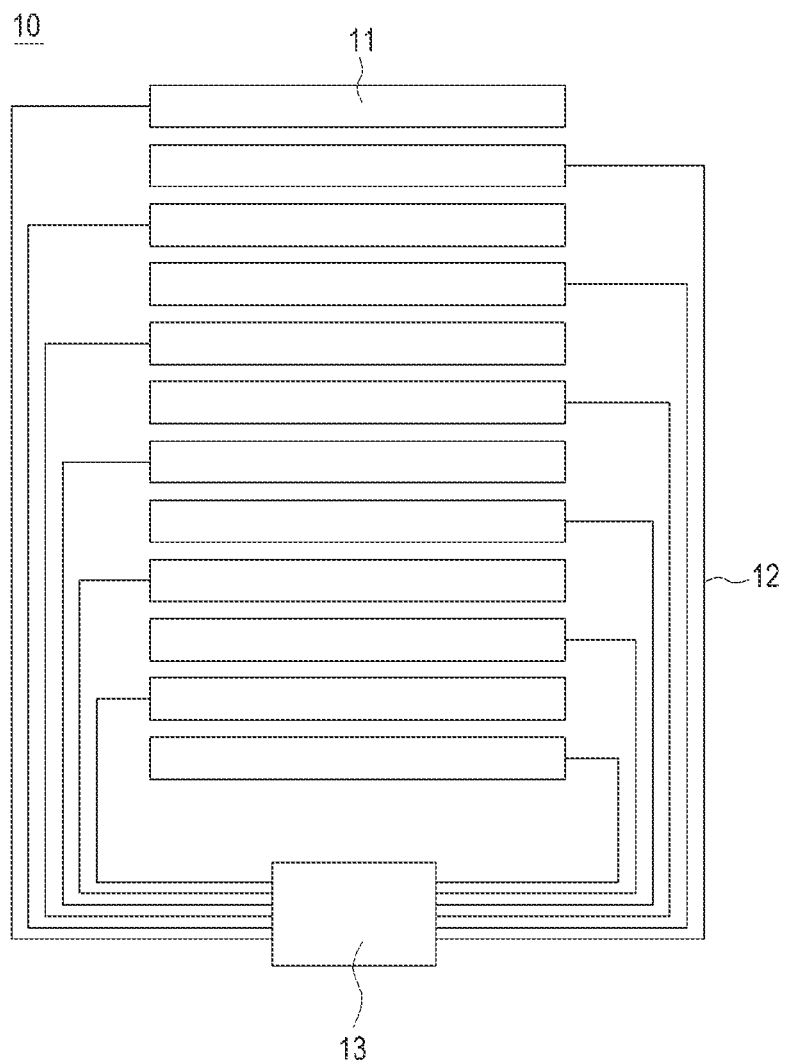
FIG. 2 is a simplified diagram illustrating another conventional position measuring apparatus in which a number of sensing electrodes is doubled in order to double the touch resolution of the conventional position measuring apparatus illustrated in FIG. 1.

Embodiments of the present invention are described as follows with reference to the attached drawings. The thicknesses of lines or the sizes of components may be exaggerated in the drawings, for clarity and convenience sake. Although the terms used in the present invention are selected from generally known and used terms, the terms may be changed according to the intention of a user or an operator, or customs. While ordinal numbers like first, second, etc. can be used to describe a number of components, such components according to embodiments of the present invention are not limited by the terms. Herein, such terms are used to distinguish one component from other components. For example, a first component may be referred to as a second component or vice versa within the scope and spirit of the present invention.

A position measuring apparatus according to an embodiment of the present invention will be described as follows with reference to FIG. 3.

Figure 3:
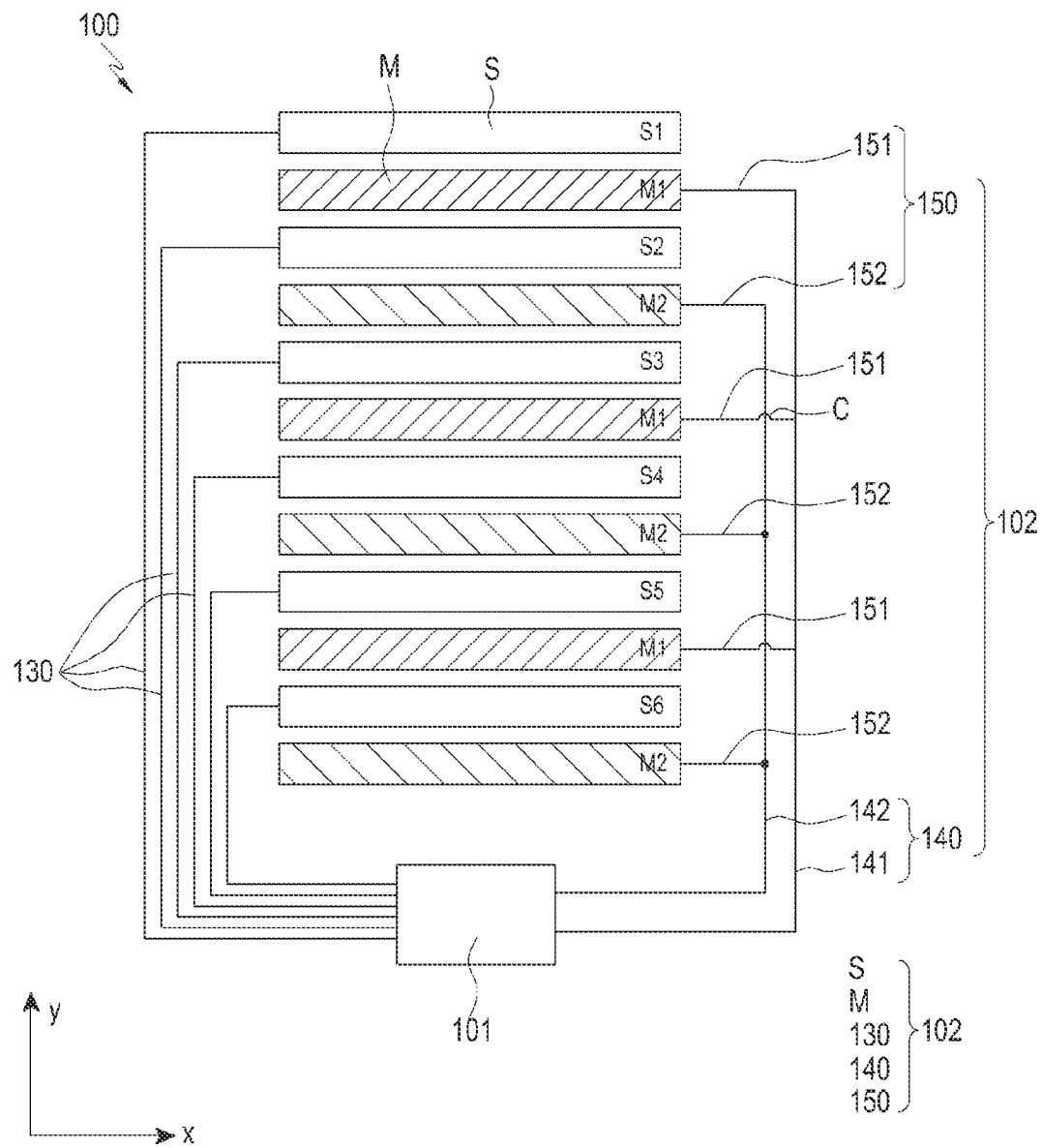
FIG. 3 is a simplified diagram illustrating a position measuring apparatus according to an embodiment of the present invention.

FIG. 3 is a simplified diagram illustrating a position measuring apparatus according to an embodiment of the present invention.

Referring to FIG. 3, a position measuring apparatus 100 includes an electrode unit 102 that includes independent channels S (which include sensing electrodes S1 to S6), multi-channels M (which include electrodes M1 and M2), independent connectors 130, common connectors 140 (which include connectors 141 and 142), and connection ports 150 (which include ports 151 and 152) for sensing a variation in capacitance or voltage caused by an object's touch. The position measuring apparatus 100 further includes a control circuit unit 101 for exchanging electrical signals with the electrode unit 102. The electrode unit 102 includes sensing electrodes S1 to S6 and M1 and M2 and connectors 130, 140 and 150 for electrically connecting the sensing electrodes S1 to S6 and M1 and M2 to the control circuit unit 101. The sensing electrodes S1 to S6 and M1 and M2 are divided into sensing electrodes S1 to S6 for independent channels S and sensing electrodes M1 and M2 for multi-channels M. When a part of the sensing electrodes S1 to S6 and M1 and M2 are connected to the control circuit unit 101, the independent channels S are connected via the independent connectors 130, and when another part of the sensing electrodes S1 to S6 and M1 and M2 are connected to the control circuit unit 101, the multi-channels M are connected via the common connectors 140.

In the present embodiment of the present invention, a plurality of sensing electrodes S1 to S6 for the independent channels S (six independent channels S in the present example) are arranged in one direction (hereinbelow, referred to as an X-axis direction), spaced from one another along a direction perpendicular to the X-axis direction (hereinbelow, referred to as a Y-axis direction). The sensing electrodes S1 to S6 for the independent channels S are independently connected to the control circuit unit 101 via the independent connectors 130.

The independent connectors 130 are arranged at one side of the sensing electrodes S1 and S6 for the independent channels S, connecting the sensing electrodes S1 and S6 to the control circuit unit 101. As the independent connectors 130 connect the sensing electrodes S1 to S6 individually to the control circuit unit 101, the number of the independent connectors 130 is equal to the number of the sensing electrodes S1 to S6. For example, when there are six sensing electrodes S1 to S6 for independent channels S as illustrated in FIG. 1, six independent connectors 130 are provided to connect the six sensing electrodes S1 to S6 independently to the control circuit unit 101.

The sensing electrodes M1 and M2 for the multi-channels M are arranged alternately with the sensing electrodes S1 to S6 for the independent channels S in the vicinity of the sensing electrodes S1 to S6. Specifically, each of the sensing electrodes M1 and M2 for the multi-channels M is interposed between sensing electrodes for independent channels S. The electrodes M1 and M2 for the multi-channels M are connected collectively to the control circuit unit 101 via at least one common connector 140. The common connectors 140 are arranged at the other side of the sensing electrodes M1 and M2 for the multi-channels M and connected to the control circuit unit 101. In the present embodiment of the present invention, the common connectors 140 are divided into a first common connector 141 and a second common connector 142, which are connected to the control circuit unit 101. Thus, the sensing electrodes M1 and M2 for the multi-channels M are divided into the sensing electrodes M1 for a first multi-channel connected to the first common connector 141, and the sensing electrodes M2 for a second multi-channel connected to the second common connector 142. Therefore, the six sensing electrodes S1 to S6 for the independent channels S, the three sensing electrodes M1 for the first multi-channel M, and the three sensing electrodes M2 for the second multi-channel M are arranged in the order of the sensing electrode S1 for an independent channel S, a sensing electrode M1 for the first multi-channel, the sensing electrode S2 for an independent channel S, a sensing electrode M2 for the second multi-channel, the sensing electrode S3 for an independent channel S, a sensing electrode M1 for the first multi-channel, the sensing electrode S4 for an independent channel S, a sensing electrode M2 for the second multi-channel, the sensing electrode S5 for an independent channel S, a sensing electrode M1 for the first multi-channel, the sensing electrode S6 for an independent channel S, and a sensing electrode M2 for the second multi-channel. Although the present embodiment of the present invention has been described with respect to sensing electrodes M1 and M2 for two multi-channels M, connected to the two common connectors 141 and 142, alternate common connectors 141 and 142, alternate with each other with a sensing electrode for an independent channel S interposed between them, the present invention is not limited to this configuration.

In another example, multi-channels M of only one type are provided and are connected to the control circuit unit 101 via a single common connector 140. In this alternate example, each of the sensing electrodes M1 for the multi-channels M are interposed between sensing electrodes for independent channels S. The arrangement order or number of multi-channels M varies according to the number of the common connectors 140.

In yet another example, if three common connectors 140 are provided, three multi-channels are arranged sequentially, with a sensing electrode for an independent channel S interposed between them. Specifically, sensing electrodes for independent channels S and the three multi-channels M are arranged in the order of a sensing electrode for an independent channel S, a sensing electrode for a first multi-channel, a sensing electrode for an independent channel S, a sensing electrode for the second multi-channel, and a sensing electrode for an independent channel S, a sensing electrode for a third multi-channel.

Accordingly, the electrode pattern 100 may be formed in various manners according to the number of common connectors 140 and the number of multi-channels M connected to the common connectors 140.

Connection ports 150 are interposed between the sensing electrodes M1 and M2 for the multi-channels M and the common connectors 140. In the present embodiment of the present invention, the sensing electrodes M1 for the first multi-channel are connected to the first common connector 141 via the first connection ports 151 and the sensing electrodes M2 for the second multi-channel are connected to the second common connector 142 via the second connection ports 152. The first connection ports 151 meet the second common connector 142 at intersection points C and the second connection ports 152 meet the first common connector 141 at intersection points C. For example, when the first common connector 141 is disposed outside the second common connector 142, the first connection ports 151 are connected to the first common connector 141, crossing the second common connector 142 at the intersection points C, as illustrated in FIG. 1. To insulate the first connection ports 151 from the second common connector 142 at the intersection points C, insulation members 162 are provided. The insulation members 162 are formed on at least one of an electrode layer having sensing electrodes (an X-axis electrode unit X and/or a Y-axis electrode unit Y or 170) and an insulation layer D.

If 12 channels in total are provided by interposing each of the sensing electrodes M1 and M2 for the six multi-channels M between every two of the sensing electrodes S1 to S6 for the six independent channels S, the total number of connectors connecting the channels (the sum of the number of the independent connectors 130 and the number of the common connectors 140) is 8, because the six independent connectors 130 connect the sensing electrodes S1 to S6 for the independent channels S to the control circuit unit 101 and the two first and second common connectors 141 and 142 connect the sensing electrodes M1 and M2 for the first and second multi-channels M to the control circuit unit 101.

If 16 channels are provided by interposing each of eight multi-channels between every two of eight independent channels S, the total number of required connectors is 10. Specifically, eight independent connectors 130 connect sensing electrodes S1 to S8 for the independent channels S to the control circuit unit 101 and the two first and second common connectors 141 and 142 connect the sensing electrodes M1 and M2 for the first and second multi-channels M to the control circuit unit 101. Accordingly, a resolution can be increased by increasing the total number of sensing electrodes without a high increase in the total number of connectors. As a result, the connectors occupy almost the same space as in the conventional technology.

The position measuring apparatus 100 includes electrodes arranged in two opposite directions so that the sensing electrodes for the independent channels S and the multi-channels M arranged in one direction may cross each other.

An X-axis electrode unit X formed in the X-axis direction and a Y-axis electrode unit Y formed in the Y-axis direction are overlaid with each other and a touched position (i.e., a position touched via user input) is sensed based on a variation in sensing electrodes positioned at an intersection between the X-axis and Y-axis electrode units X and Y. At least one of the X-axis and Y-axis electrode units includes the afore-described independent channels S and multi-channels M. More specifically, the sensing electrodes for the independent channels S and the multi-channels M and the connectors 130, 140 and 150 are formed in such a manner that one of the X-axis and Y-axis electrode units X and Y includes the independent channels S and the multi-channels M and the other electrode unit includes only the independent channels S, to which the present invention is not limited. For example, the independent channels S and the multi-channels M may be formed in both the X-axis and Y-axis electrode units X and Y. Thus, various modifications can be made according to a module in which the position measuring apparatus 100 is provided. Similar configurations may also be applied to other embodiments of the present invention, such as those described later herein.

If each of the X-axis and Y-axis electrode units X and Y includes the independent channels S and the multi-channels M, the independent channels S in the X-axis or Y-axis electrode unit X or Y are connected to a Transmission (Tx) end of the control circuit unit 101 that generates a signal for sensing an object's touch and the multi-channels M in the X-axis or Y-axis electrode unit X or Y are connected to a Reception (Rx) end of the control circuit unit 101.

If the X-axis electrode unit X includes the independent channels S and the multi-channels M and the Y-axis electrode unit Y includes only the independent channels S, the independent channels S in the X-axis and Y-axis electrode units X and Y are connected to the Tx end of the control circuit unit 101 that generates a signal for sensing an object's touch and the multi-channels M in the X-axis electrode unit X are connected to the Rx end of the control circuit unit 101 that receives a signal.

FIGS. 4A through 4D are simplified diagrams illustrating a configuration of the position measuring apparatus illustrated in FIG. 3 according to an embodiment of the present invention. FIG. 5 illustrates a state where structures illustrated in FIGS. 4A through 4D are layered according to an embodiment of the present invention.

The configuration described below with reference to FIGS. 4 and 5 may also be applied to other embodiments of the present invention described later herein. Therefore, other embodiments of the present invention described hereinafter are described with a focus on features that differ from previously-described embodiments.

Figure 4:
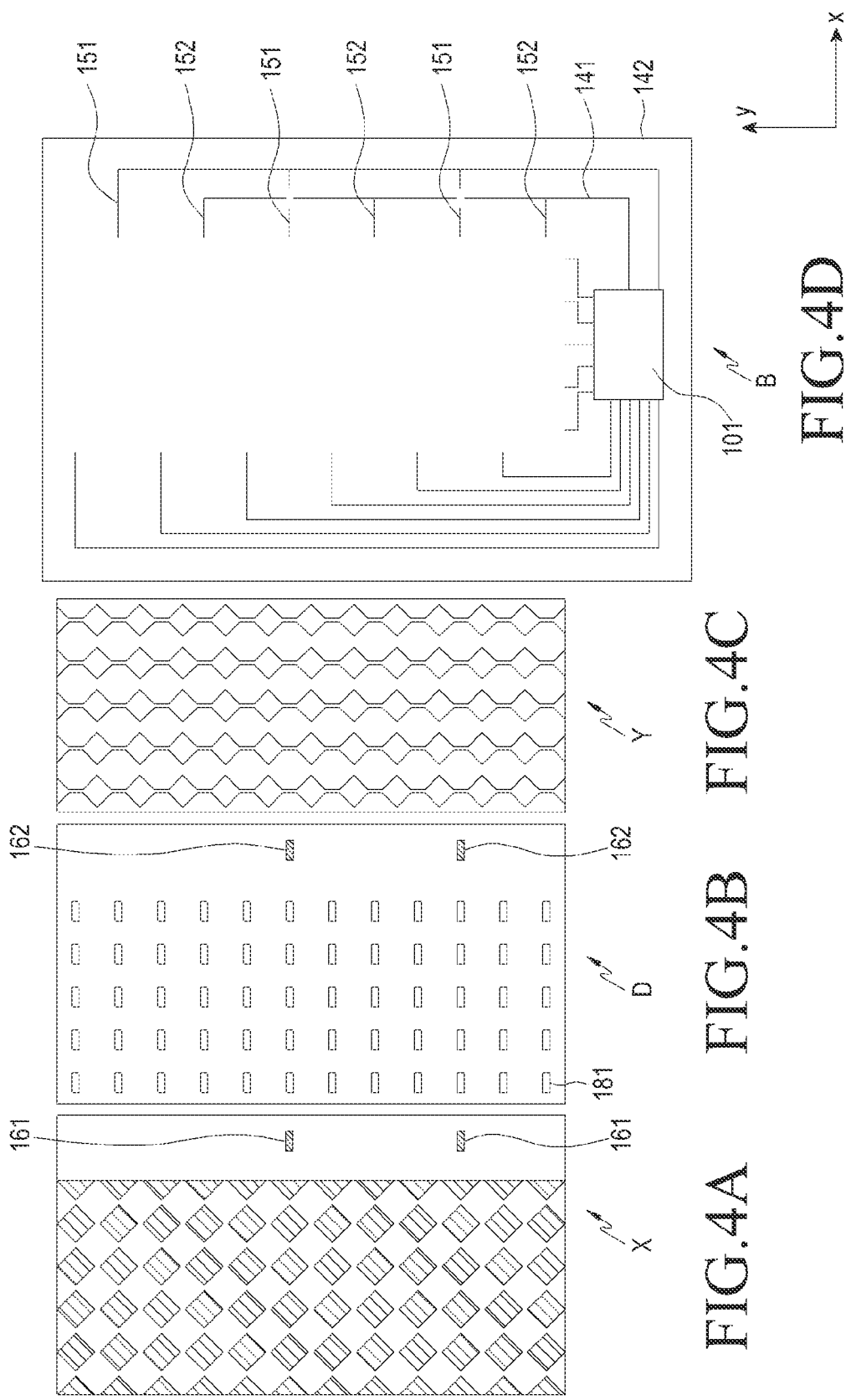
FIGS. 4A through 4D are simplified diagrams illustrating the configuration of the position measuring apparatus illustrated in FIG. 3.
Figure 5:
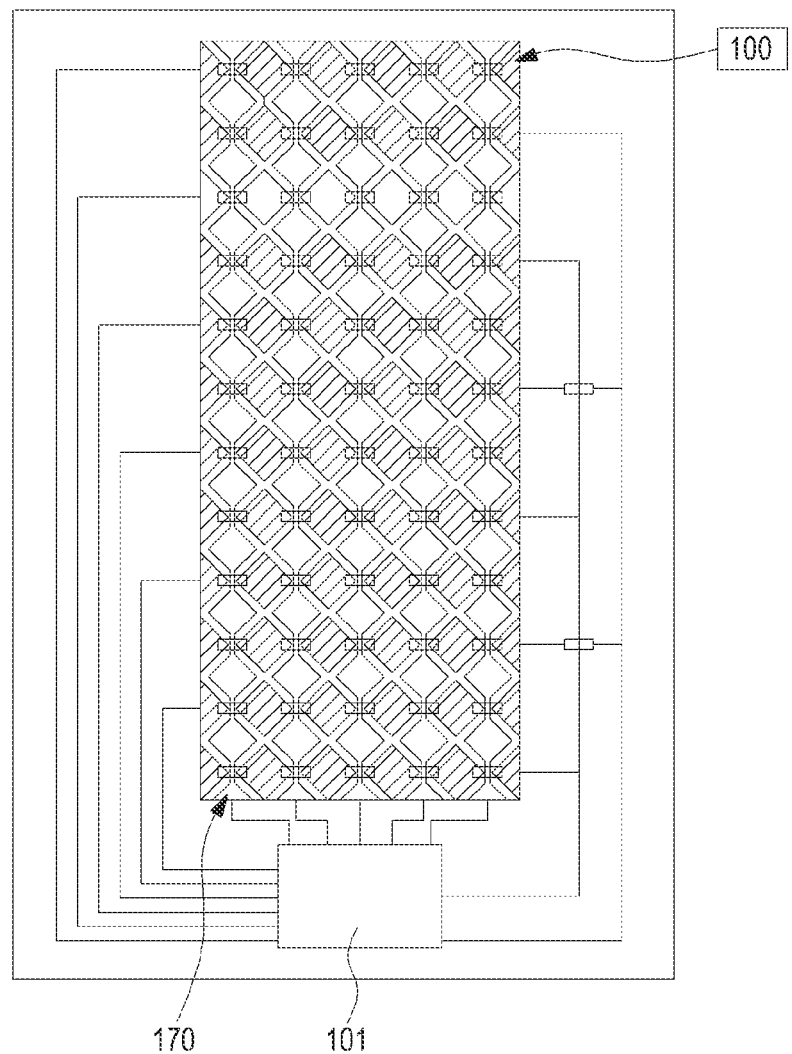
FIG. 5 illustrates a state where structures illustrated in FIGS. 4A through 4D are layered.

Referring to FIGS. 4 and 5, the X-axis electrode unit X having sensing electrodes arranged in the X-axis direction and the Y-axis electrode unit X having sensing electrodes arranged in the Y-axis direction are layered on opposite surfaces with the insulation layer D interposed in between.

When the X-axis electrode unit X is formed, the patterns 161 are also formed on the X-axis electrode unit X in order to electrically connect the intersection points C of the connection ports 150. In addition, the insulation members 162 are formed on the insulation layer D to insulate the intersection points of the connection ports 150. As an electrical connection can be insulated at the intersection point C simply by stacking a substrate B, the Y-axis electrode unit Y, the insulation layer D, and the X-axis electrode unit X, fabrication cost is remarkably reduced and an assembly process is simplified.

In the present embodiment of the present invention, diamond patterns are uniformly repeated in one direction for the sensing electrodes for the independent channels S and the multi-channels M or a direction perpendicular to this direction, for example. However, the shapes of the sensing electrodes for the independent channels S and the multi-channels M are not limited thereto. For example, the sensing electrodes for the independent channels S and the multi-channels M may take the form of lines.

Figure 13:
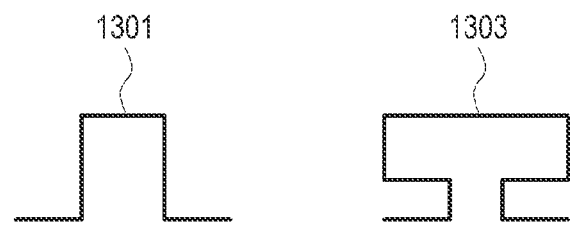
FIG. 13 is a diagram illustrating examples of geometric patterns of sensing electrodes and multi-channels according to an embodiment of the present invention.

FIG. 13 is a diagram illustrating examples of geometric patterns of sensing electrodes and multi-channels according to an embodiment of the present invention.

As shown in FIG. 13, it is also possible to uniformly repeat curved geometric patterns, such as patterns 1301 and 1303 for the sensing electrodes for the independent channels S and the multi-channels M. The same configuration may also be applied to other embodiments of the present invention described herein.

Referring to FIGS. 3 and 4A to 4D, connectors 130, 140 and 150 for connecting the independent channels S and/or the multi-channels M of the X-axis electrode unit X to the control circuit unit 101 and connectors 130, 140 and 150 for connecting the independent channels S and/or the multi-channels M of the Y-axis electrode unit Y to the control circuit unit 101 are formed on the substrate B. Herein, the intersection points C, at which the connection ports 151 cross the common connectors 140, are not connected. The intersection points C are electrically connected by patterns 111 formed on the X-axis electrode unit X and electrically insulated by the insulation members 162 of the insulation layer D by stacking the substrate B, the Y-axis electrode unit Y, the insulation layer D, and the X-axis electrode unit X. Specifically, at the position intersection point C, the patterns 161 are formed on the X-axis electrode unit X and the insulation members 162 are formed on the insulation layer D. Therefore at the position intersection point C, the connection ports 151 and the first common connector 141 electrically are connected by the patterns 161 and the first connection ports 151 and the second common connector 142 are not connected by the insulation members 162. It is also possible to replace the electrodes applied to the X-axis electrode unit X with electrodes used in the later-described embodiments of the present invention. In different embodiments of the present invention described herein, the overall shapes, arrangements, and positions of sensing electrodes and connectors are changed by configuring the electrode units in different manners. By changing these configurations, the positions of the insulation members 162 on the insulation layer D and the layout, arrangement, or intersection points C of ports disposed on the substrate B are changed. Nonetheless, the layered structure of the X-axis electrode unit X, the insulation layer D, the Y-axis electrode unit Y, and the substrate B is identical in the embodiments of the present invention. Therefore, the description of this particular embodiment of the present invention is also referenced herein below in describing the other embodiments of the present invention.

Figure 12:
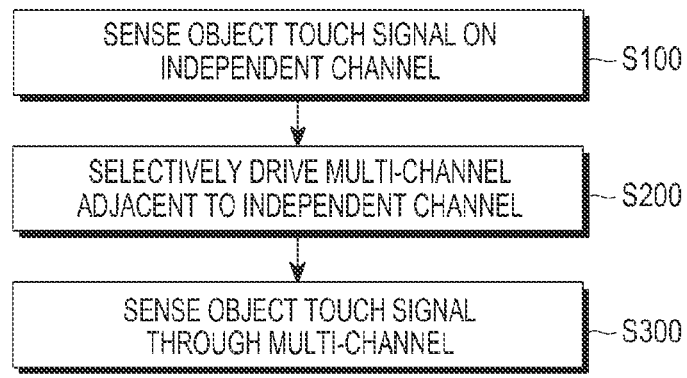
FIG. 12 is a flowchart illustrating a method for driving the position measuring apparatus according to an embodiment of the present invention.

A method for driving the position measuring apparatus having the above-described configuration is described as follows with reference to FIG. 12 If the length of an object touching the position measuring apparatus 100 is greater than the distance between a sensing electrode for an independent channel S and its adjacent sensing electrode, the touched position can be determined just with the independent channel S and thus the multi-channels M are not operated. However, if the length of an object touching the position measuring apparatus 100 is less than the distance between a sensing electrode for an independent channel S and its adjacent sensing electrode, for example, the distance between the sensing electrodes S1 and S2 for independent channels S, the touched position is determined using the independent channel S and a multi-channel M.

Hence, when an object touches the X-electrode unit X and/or the Y-axis electrode Y having the electrode unit 102, a variation in the capacitance or voltage of a sensing electrode for an independent channel S corresponding to the touched position is applied to the control circuit unit 101 through an independent connector connected to the sensing electrode and the control circuit unit 101 senses the applied signal, in step S100. If the length of the object is less than the sensing electrode for the independent channel S and its adjacent sensing electrode, a multi-channel M adjacent to the independent channel (i.e., the sensing electrode for the multi-channel M adjacent to the sensing electrode for the independent channel) is selectively driven in response to a touch signal applied to the sensing electrode for the independent channel S, in step S200. Then, the sensing electrode for the adjacent multi-channel M senses the touch of the object, in step S300. Thus, a position touched by the object can be accurately determined.

If the touched position is apart from an independent channel S, the independent channel S and its adjacent multi-channel M are driven, to thereby accurately locating the touch of the object.

Figure 6:
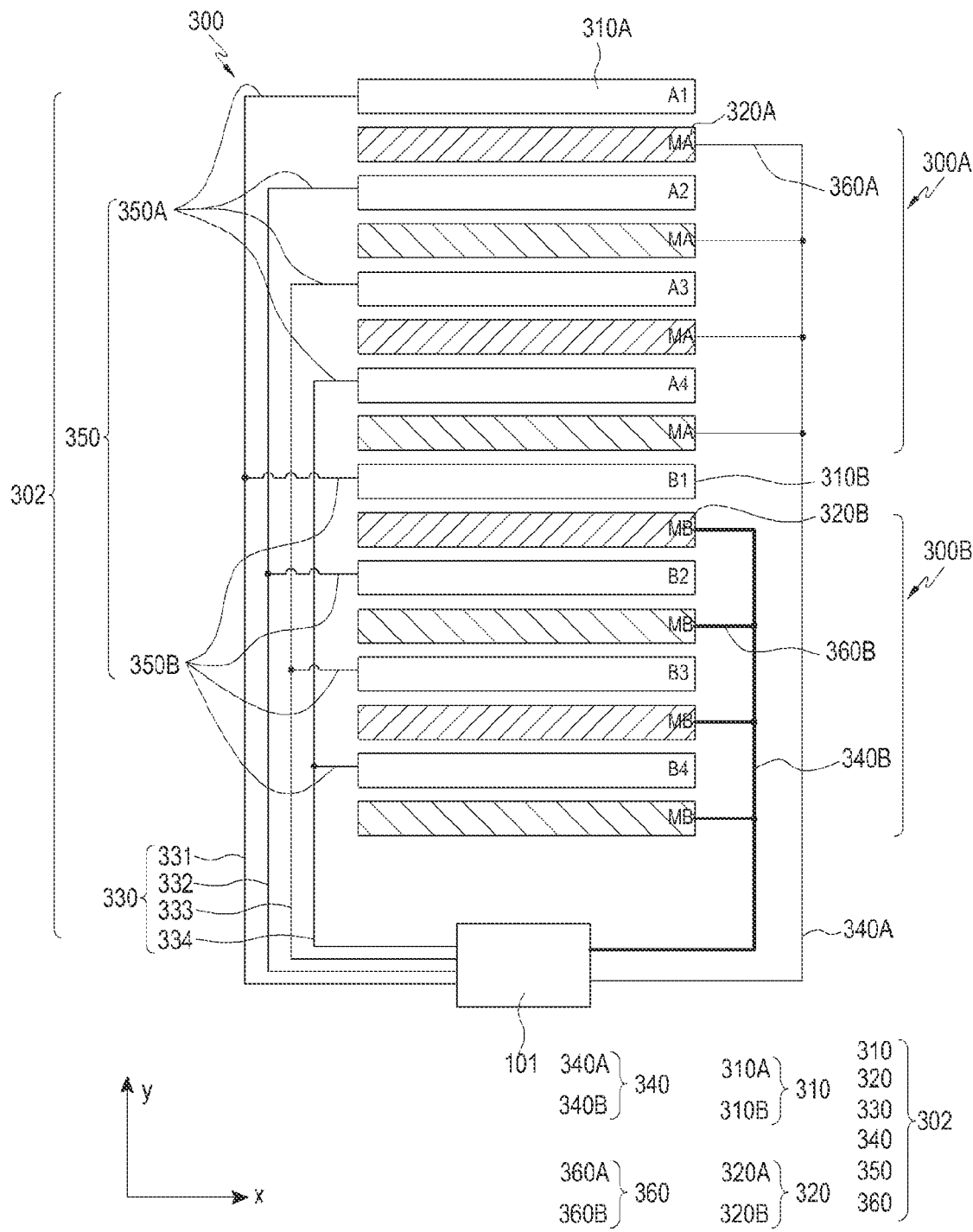
FIG. 6 is a simplified diagram illustrating a position measuring apparatus according to another embodiment of the present invention.

FIG. 6 is a simplified diagram illustrating a position measuring apparatus according to another embodiment of the present invention.

Referring to FIG. 6, in a manner similar to the position measuring apparatus 100 according to the embodiment of the present invention described with reference to FIG. 3, a position measuring apparatus 300 according to another embodiment of the present invention includes an electrode unit 302 that includes region distinguishing channels 310 (which include distinguishing channels 310A and 310B), fine position measuring channels 320 (which include fine positioning channels 320A and 320B), responsive connectors 330 (which include responsive connectors 331, 332, 333, and 334), common connectors 340 (which include first common connector 340A and second common connector 340B), connection ports 350 (which include first connection ports 350A and 350B), and MA/MB connection port 360 (which includes MA connection port 360A and MB connection port 360B). The electrode unit 302 senses a capacitance or voltage variation caused by an object's touch, and further includes the control circuit unit 101 for exchanging electrical signals with the electrode unit 302. The electrode unit 302 also includes sensing electrodes A1 to A4, B1 to B4, MA, and MB for sensing an object's touch and connectors 330 and 340 for electrically connecting the sensing electrodes A1 to A4, B1 to B4, MA, and MB to the control circuit unit 101. The electrode unit 302 has a plurality of multi-channels 300A and 300B. In this embodiment of the present invention, the electrode unit 302 includes the plurality of multi-channels 300A and 300B electrically connected to the control circuit unit 101 through the connectors 330 and 340 that connect the sensing electrodes A1 to A4, B1 to B4, MA, and MB to one another. These multi-channels 300A and 300B are divided into region distinguishing channels 310A and 310B and fine position measuring channels 320A and 320B. A plurality of sensing electrodes A1 to A4 and B1 to B4 are arranged in one direction for the region distinguishing channels 310A and 310B, and only one of the sensing electrodes MA and MB is interposed between every pair of adjacent sensing electrodes A1 to A4 and B1 to B4 for the region distinguishing channels 310A and 310B. That is, in this embodiment of the present invention, the two multi-channels 300A and 300B are provided and the multi-channel 300A includes the region distinguishing channels 310A and the fine position measuring channel 320A, while the multi-channel 300B includes the region distinguishing channels 310B and the single fine position measuring channel 320B. Each of the region distinguishing channels 310A and 310B has four sensing electrodes A1 to A4 or B1 to B4 and each of the fine position measuring channels 320A and 320B includes four sensing electrodes MA or MB. However, the number of the multi-channels 300A and 300B and the number of the sensing electrodes A1 to A4, B1 to B4, MA, and MB are not limited to the above specific values in accordance with embodiments of the present invention. For instance, the number of the multi-channels 300A and 300B and the number of the sensing electrodes A1 to A4, B1 to B4, MA, and MB are preferably determined, taking into account the spacing of the sensing electrodes A1 to A4, B1 to B4, MA, and MB or the size of the position measuring apparatus 300.

Specifically, the multi-channel 300A (multi-channel A) includes the region distinguishing channels 310A with the plurality of sensing electrodes A1 to A4 and the single fine position measuring channel 320A with the plurality of sensing electrodes MA.

Each of the sensing electrodes MA is disposed adjacent to one of the sensing electrodes A1 to A4. Thus, the four sensing electrodes MA alternate with the sensing electrodes A1 to A4. The sensing electrodes A1 to A4 of the region distinguishing channels 310A in multi-channel A are connected to the control circuit unit 101 through the respective connectors 330. The sensing electrodes MA of the fine position measuring channel 320A are connected to the control circuit unit 101 through a single connector 340A.

The multi-channel 300B (multi-channel B) includes the region distinguishing channels 310B with the plurality of sensing electrodes B1 to B4 and the fine position measuring channel 320B with the plurality of sensing electrodes MB. Each of the sensing electrodes MB is disposed adjacent to one of the sensing electrodes B1 to B4. Thus, the four sensing electrodes MB alternate with the sensing electrodes B1 to B4. The sensing electrodes B1 to B4 of the region distinguishing channels 310B in multi-channel B are connected to the control circuit unit 101 through the respective connectors 330. The sensing electrodes MB of the fine position measuring channel 320B are connected to the control circuit unit 101 through a single connector 340B.

Accordingly, the sensing electrodes are arranged sequentially in the order of A1, MA, A2, MA, . . . , B3, MB, B4, and MB.

The states of the connectors 340A and 340B of multi-channel A and multi-channel B are described below. As described before, the region distinguishing channels 310A of multi-channel A are connected to the respective connectors 330, i.e., the sensing electrodes A1 to A4 are connected to the control circuit unit 101 through the four respective connectors 330. The sensing electrodes B1 to B3 of the region distinguishing channels B1 to B4 in multi-channel B are connected in their arrangement order to the connectors 330 connected to the sensing electrodes A1 to A4 of the region distinguishing channels 310A in multi-channel A, i.e., the sensing electrodes B1 to B4 are connected to the same connectors 330 as connected to the sensing electrodes A1 to A4 in the same arrangement order. More specifically, a first connector 331 connects the sensing electrodes A1 and B1 electrically to the control circuit unit 101. A second connector 332 connects the sensing electrodes A2 and B2 electrically to the control circuit unit 101. A third connector 333 connects the sensing electrodes A3 and B3 electrically to the control circuit unit 101. A fourth connector 334 connects the sensing electrodes A4 and B4 electrically to the control circuit unit 101.

The sensing electrodes MA of the fine position measuring channel 320A in multi-channel A are connected to the control circuit 101 through the single common connector 340A. The sensing electrodes MB of the fine position measuring channel 320B in multi-channel B are connected to the control circuit 101 through the single common connector 340B separate from the first common connector 340A.

In the position measuring apparatus 300, the total number of sensing electrodes 310 and 320 (i.e., all sensing electrodes included in the plurality of multi-channels 300A and 300B) is 16, and the total number of connectors 330 and 340 (i.e. the first to fourth connectors 331 to 334 and the first and second common connectors 340A and 340B) is 6. Specifically, multi-channel A has the four sensing electrodes A1 to A4 in the region distinguishing channels 310A and the four sensing electrodes MA in the fine position measuring channel 320A, and multi-channel B has the four sensing electrodes B1 to B4 in the region distinguishing channels 310B and the four sensing electrodes MB in the fine position measuring channel 320B. Thus 16 sensing electrodes are arranged.

In comparison, no more than 6 connectors suffice, i.e., the four connectors 331 to 334 are provided to the sensing electrodes A1 to A4 and B1 to B4 to the control circuit unit 101 in an integrated manner and the first and second common connectors 340A and 340B are provided to connect the sensing electrodes MA and the sensing electrodes MB commonly to the control circuit unit 101. Thus the 16 sensing electrodes 310 and 320 can be connected to the control circuit unit 101 using only the six connectors 330 and 340. Accordingly, a resolution can be increased by increasing the total number of sensing electrodes 310 and 320 without a significant increase in the total number of connectors 330 and 340. As a result, the connectors 330 and 340 occupy almost the same or less space as the space occupied by connectors in conventional technology.

These sensing electrodes 310 and 320 include a plurality of transparent electrodes and a metal connecting the transparent electrodes, or transparent electrodes and other transparent electrodes connected to the transparent electrodes.

Figure 8:
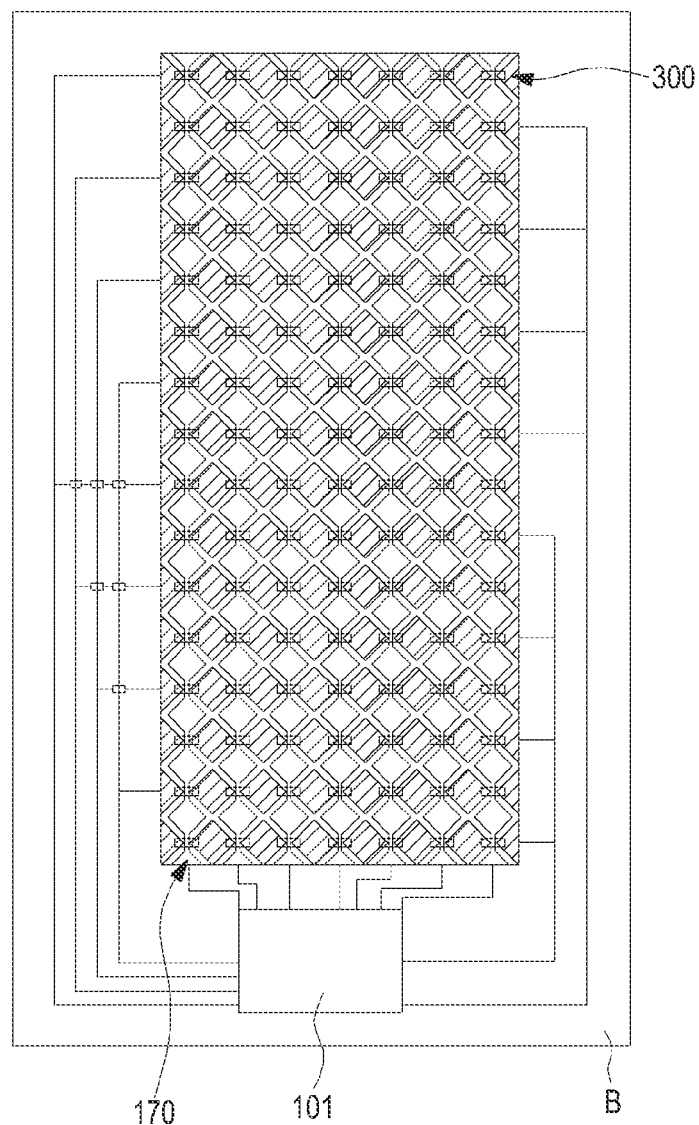
FIG. 8 illustrates a state where structures illustrated in FIGS. 7A through 7D are layered.

FIGS. 7A through 7D are simplified diagrams illustrating a configuration of the position measuring apparatus illustrated in FIG. 6 and FIG. 8 illustrates a state where the structures illustrated in FIG. 7A through 7D are layered.

Referring to FIGS. 6, 7A through 7D, and FIG. 8, as described before in relation to the position measuring apparatus 100 of FIG. 3, the position measuring apparatus 300 is provided with the electrode unit 302 arranged in two directions so that the sensing electrodes 310 and 320 arranged in one direction may cross each other. The position measuring apparatus 300 is the same as the position measuring apparatus 100 except that the electrodes 310 to 360 are formed in the X-axis and Y-axis electrode units X and Y, i.e., the electrode unit 302 is arranged in the multi-channels 300A and 300B in the X-axis electrode unit X and/or the Y-axis electrode unit Y. As shown in FIGS. 7A through 7D, when the X-axis electrode unit X is formed, patterns 161 are also formed on the X-axis electrode unit X in order to electrically connect connection ports 350A and 350B to the connectors 330 and 340 at the intersection points C. In addition, the insulation members 162 are formed on the insulation layer D to insulate the connection ports 350A and 350B from the intersection points C.

Therefore, electrical connection of the connectors, electrical connection of the intersection points C of the sensing electrodes 310 and 320, and insulation of the connection ports 350A and 350B from the intersection points C are with a stack of only the four layers of the X-axis electrode unit X, the insulation layer D, the Y-axis electrode unit Y, and the substrate B.

A method for driving the position measuring apparatus 300 having the afore-described configuration according to an embodiment of the present invention is described as follows.

If the length of an object touching the position measuring apparatus 300 is greater than the distance between a sensing electrode 310 or 320 of the region distinguishing channels 310A or 310B and its adjacent sensing electrode (e.g., the distance between the sensing electrodes A2 and A3), the touched position can be determined simply with the sensing electrode, and thus the sensing electrodes 310 and 320 of the fine position measuring channels 320A and 320B are not operated. However, if the length of the object is less than the distance between the sensing electrode and its adjacent sensing electrode, the touched position is determined using the region distinguishing channels 310A and 310B and the fine position measuring channels 320A and 320B.

Therefore, when an object touches the X-axis electrode unit X and/or the Y-axis electrode unit Y that has the electrode unit 310 to 360, a variation in the capacitance or voltage of a sensing electrode 310 or 320 of the region distinguishing channels 310 or 320 is provided to the control circuit unit 101 and the control circuit unit 101 senses the applied signal. If the length of the object is less than the distance between the sensing electrode 310 or 320 of the region distinguishing channels 310 or 320 and its adjacent sensing electrode 310 or 320, the sensing electrode 310 or 320 of a fine position measuring channel 320A or 320B, specifically a sensing electrode 310 or 320 adjacent to the sensing electrode 310 or 320 that has sensed the touch is selectively driven. Thus, the sensing electrode 310 or 320 of the fine position measuring channel 320A or 320B adjacent to the sensing electrode 310 or 320 of the region distinguishing channels 310A or 310B senses the object's touch, thereby accurately locating the touch of the object. If the touched position is apart from the sensing electrode 310 or 320 of the region distinguishing channels 310A or 310B, its adjacent sensing electrode 310 or 320 of the fine position measuring channel 320A or 320B is driven and thus the touched position is accurately determined. The same thing applies to the later-described other embodiment of the present invention, except that independent channels are further used to thereby determine a position touched by an object.

Figure 9:
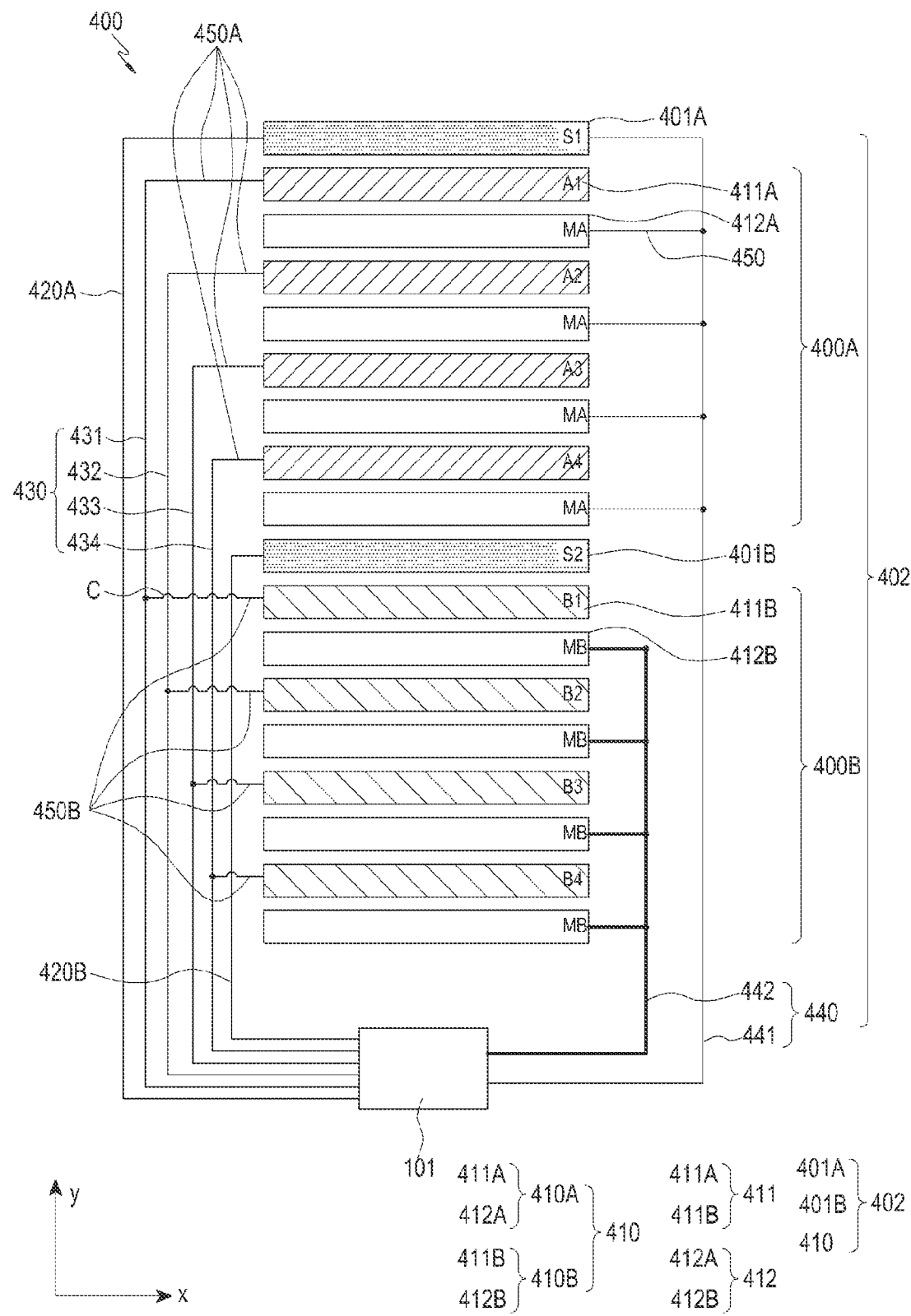
FIG. 9 is a simplified diagram illustrating a position measuring apparatus according to a further embodiment of the present invention.
Figure 10A:
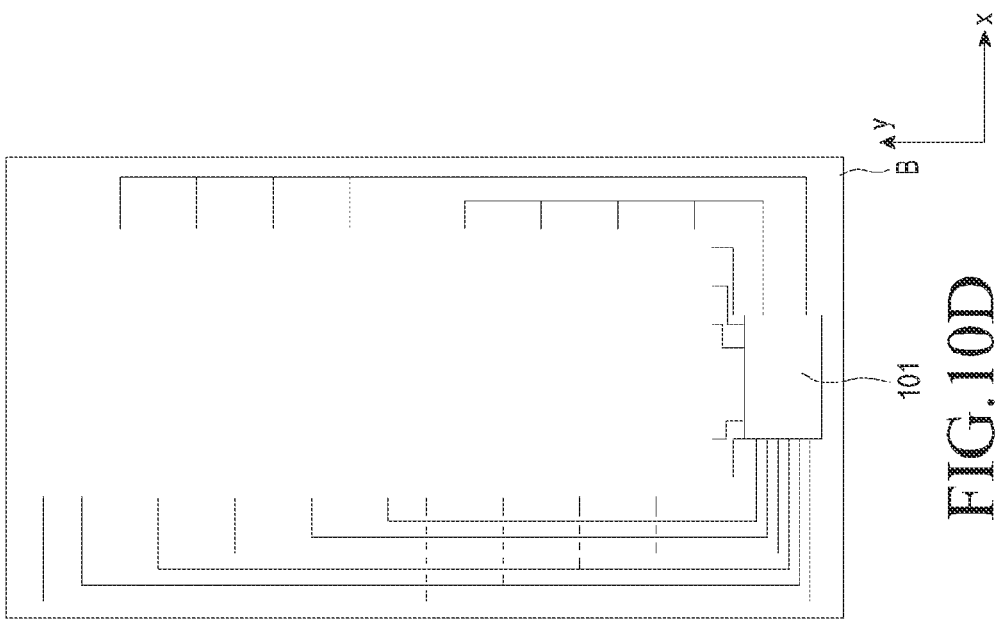
FIGS. 10A through 10D are simplified diagrams illustrating the configuration of the position measuring apparatus illustrated in FIG. 9.
Figure 10B:
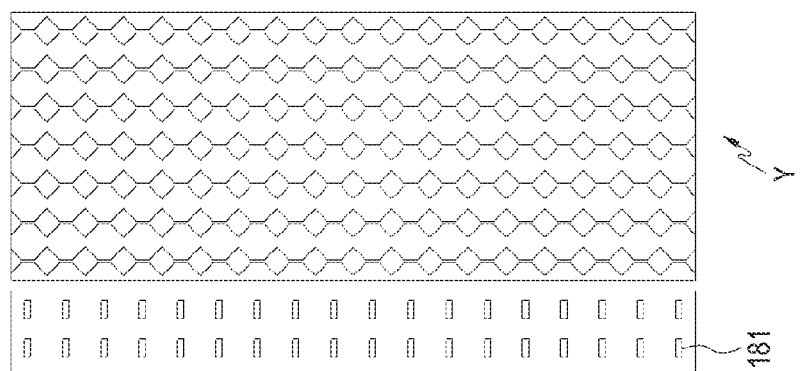
Figure 10C:
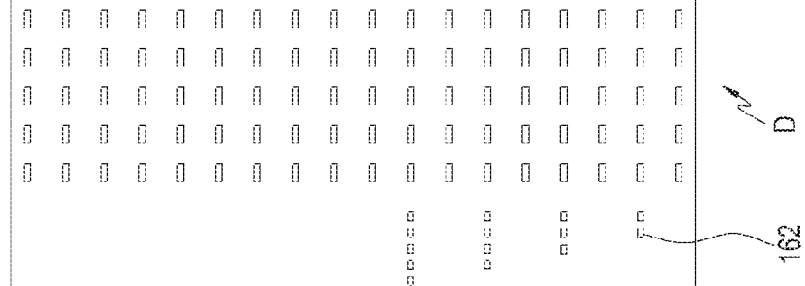
Figure 10D:
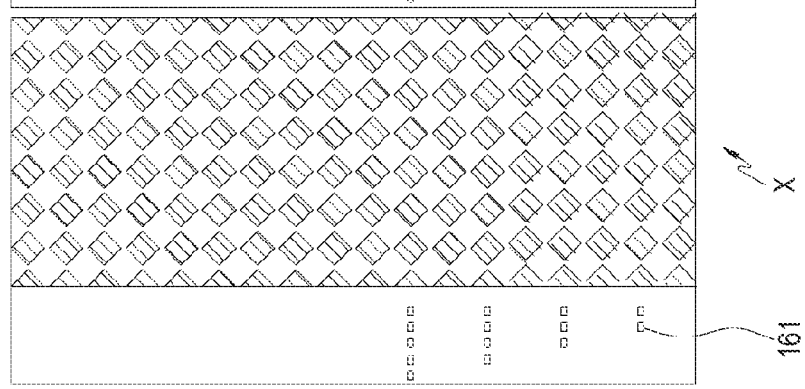

FIG. 9 is a simplified diagram illustrating a position measuring apparatus according to a further embodiment of the present invention.

Referring to FIG. 9, a configuration of a position measuring apparatus 400 is similar to that of the configuration of the position measuring apparatus 300 (see FIG. 6), except that independent channels 401A and 401B are further provided in addition to multi-channels 400A and 400B.

More specifically, an electrode unit 402 (which includes independent channels 401A and 401B and 410 includes a plurality of multi-channels 400A and 400B and the independent channels 401A and 401B. Reference Numeral 410 includes multi-channels 410A and 410B). Thus, reference numeral 410' indicates multi-channel. As in the embodiment of the present invention described with reference to FIG. 6, the multi-channels 400A and 400B include region distinguishing channels 411 and fine position measuring channels 412. The sensing electrodes of the region distinguishing channels 411 and the fine position measuring channels 412 are connected to connectors 430 and 440 in the same manner as in the second embodiment of the present invention. For reference, the same names are used for the same components as in the embodiment of the present invention described with reference to FIG. 6, but are denoted by different reference numerals. More specifically, reference numerals 400A and 400B denote the multi-channels, reference numerals 411A and 412A denote the region distinguishing channels and the fine position measuring channel of the multi-channel 400A, respectively, reference numerals 411B and 412B denote the region distinguishing channels and the fine position measuring channel of the multi-channel 400B, respectively, and reference numerals 441 and 442 denote first and second common connectors, respectively.

This embodiment described with reference to FIG. 9 is characterized in that the independent channels 401A and 401B are formed adjacent to the multi-channels 400A and 400B. For example, the electrode unit 402 includes the two multi-channels 400A and 400B each of which has the independent channel 401A or 401B. Specifically, the independent channel 401A is disposed adjacent to the multi-channel 400A and the independent channel 401B is disposed adjacent to the multi-channel 400B. The independent channels 401A and 401B are connected to the control circuit unit 101 through independent connectors 420A and 420B, respectively. Sensing electrodes S1 and S2 for the independent channels 401A and 401B are arranged adjacent to the multi-channels 400A and 400B, specifically adjacent to sensing electrodes for the region distinguishing channels 411. More specifically, the sensing electrode S1 of the independent channel 401A is adjacent to the sensing electrode A1 of a region distinguishing channel 411A and the sensing electrode S2 of the independent channel 401B is adjacent to the sensing electrode B1 of a region distinguishing channel 411B. The sensing electrodes S1 and S2 for the independent channels 401A and 401B are electrically connected to the control circuit unit 101 through the independent connectors 420A and 420B. In this embodiment of the present invention, a total of 18 sensing electrodes are provided. Since only eight connectors 430 and 440 are provided, many sensing electrodes can be electrically connected to the control circuit unit 101 through a small number of connectors 430 and 440. In addition, the sensing electrodes S1 and S2 can be densely arranged in a given space, and thus a position touched by an object can be accurately determined. Therefore, a high touch resolution can be realized. The installation space of the connectors 430 and 440 is the same as or less than an installation space used in conventional technology.

While the two multi-channels 400A and 400B are provided and the independent channels 401A and 401B are formed in the multi-channels 401A and 401B in this embodiment of the present invention, this configuration does not limit the present invention. For example, it is possible to form the independent channels 401A and 401B at the outermost sides of the electrode unit 401A, 401B and 410. For instance, the independent channels 401A and 401B are formed at the top or bottom of the electrode unit 401A, 401B and 410 or at an upper or lower part of the electrode unit 401A, 401B and 410 and the independent connectors 420A and 420B are arranged so as to connect the sensing electrodes S1 and S2 of the independent channels 401A and 401B independently to the control circuit unit 101.

When the X-axis electrode unit X is formed, intersection points are created on connection ports 450, specifically connection ports 450 that connect the sensing electrodes of the region distinguishing channels in multi-channel B to the respective connectors 430. Therefore, there is a need for a structure that electrically insulates the connection ports 450 from the intersection points C of the connectors 430 and 440 as well as electrically connects the connection ports 450 to the intersection points C of the connectors 430 and 440. Thus, the patterns 161 are also formed on the X-axis electrode unit X and/or the Y-axis electrode unit Y in order to electrically connect the connection ports 450 to the intersection points of the connectors 430 and 440. In addition, the insulation members 162 are also formed on the insulation layer D to insulate the connection ports 450 from the intersection points C. While the patterns 161 are formed on the X-axis electrode unit X and the insulation members 162 are formed on the insulation layer D, this configuration does not limit the present invention. The patterns 161 and the insulation members 162 may be provided to at least one of the X-axis electrode unit X, the Y-axis electrode unit Y, and the insulation layer D. Therefore, the intersection points C can be electrically insulated as well as electrically connected, just with a 4-layer stack of the X-axis electrode unit X, the insulation layer D, the Y-axis electrode unit Y, and the substrate B in the embodiment of the present invention.

Figure 11:
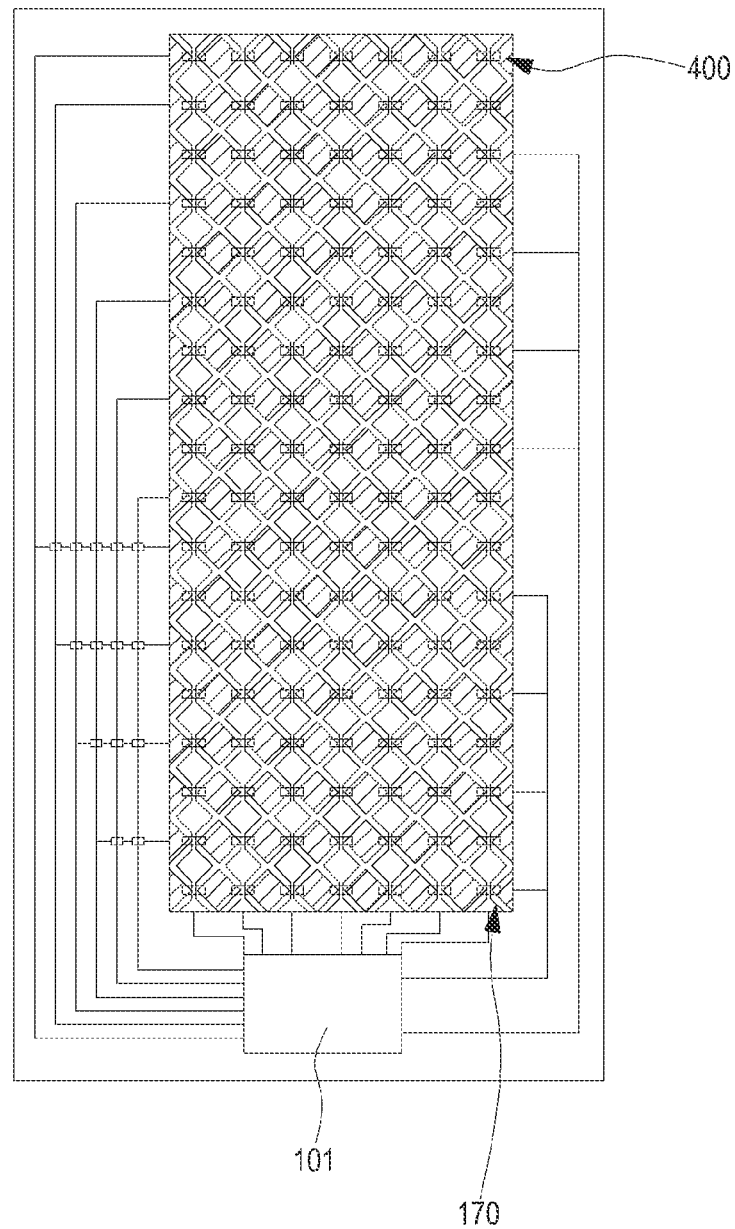
FIG. 11 illustrates a state where structures illustrated in FIGS. 10A through 10D are layered.

FIGS. 10A through 10D are simplified diagrams illustrating a configuration of the position measuring apparatus illustrated in FIG. 9 and FIG. 11 illustrates a state where structures illustrated in FIGS. 10A through 10D are layered.

Referring to FIG. 9, FIGS. 10A through 10D, and FIG. 11, the position measuring apparatus 400 is configured by adding independent channels to the plurality of multi-channels in the position measuring apparatus 300 and thus the position measuring apparatus 400 is different from the position measuring apparatus 300 in terms of the electrode unit, specifically the arrangements or patterns of the sensing electrodes and the connectors and the configuration of the insulation layer. The remaining configuration of the position measuring apparatus 400 is identical to those of the position measuring apparatuses 100 and 300, i.e., the electrode unit 401A, 401B and 410 is provided at least one of the X-axis electrode unit X and the Y-axis electrode unit Y in a position measuring apparatus having a plurality of electrodes, specifically the X-axis electrode unit X and the Y-axis electrode unit Y are layered. As the independent connectors 420A and 420B are provided to connect the sensing electrodes S1 and S2 of the independent channels 401A and 401B to the control circuit unit 101, intersection points C are further created.

Therefore, the patterns for electrically connecting the intersection points C or the insulation members 162 are disposed at the intersection points C. According to the above-described embodiments of the present invention, since many sensing electrodes can be connected to a control circuit unit through a small number of connectors, a position touched by an object can be accurately determined, thereby increasing a touch resolution.

As is apparent from the above description, touch accuracy can be increased by increasing the number of sensing electrodes, thereby increasing a touch resolution and thus increasing touch reliability.

Although the number of sensing electrodes is increased, the total number of connectors that connect the sensing electrodes to the control circuit unit is minimized. Therefore, the connectors occupy a minimal space and the size of a driving chip is not increased relative to the increased number of sensing electrodes, and, fabrication cost and installation area are reduced.

While the present invention has been particularly shown and described with reference to embodiments thereof, it will be understood by those of ordinary skill in the art that various changes in form and details may be made therein without departing from the spirit and scope of the present invention as defined by the following claims and their equivalents.

What is claimed is:

1. An apparatus for measuring a position of a touch by an object on a device including the apparatus, comprising:
    an electrode unit comprising an X-axis direction electrode unit and a Y-axis direction electrode unit for sensing a capacitance or voltage variation caused by a touch of the object;
    sensing electrodes included in the electrode unit and formed in two crossing directions of the X-axis and the Y-axis for sensing a touch of the object on a plane;
    connectors included in the electrode unit for electrically connecting the sensing electrodes to the control circuit unit;
    independent channels connected to independent connectors among the connectors, which are included in the electrode unit for the sensing electrodes arranged in at least one of the two crossing directions, the independent connectors connecting a subset of the sensing electrodes independently to the control circuit unit via said independent channels; and
    multi-channels included in the electrode unit and comprising connection ports connected to connection lines that feed to common connectors among the connectors, the common connectors connecting the remainder of the sensing electrodes commonly to the control circuit unit via said multi-channels,
    wherein the position touched by the object is measured using the sensing electrodes arranged in the two crossing directions, the sensing electrodes arranged in one direction include independent channels and the multi-channels, and the sensing electrodes arranged in the other direction perpendicular to the one direction include only independent channels,
    wherein the X-axis electrode unit having the sensing electrodes arranged in the X-axis direction and the Y-axis electrode unit having the sensing electrodes arranged in the Y-axis direction are layered on opposite surfaces with an insulation layer interposed in between, and
    wherein insulation members are formed on the insulation layer to insulate intersection points of some of the connection ports that intersect one or more of the connection lines connected to others of the connection ports, and conductive patterns are formed on the X-axis electrode unit in order to electrically connect said some of the connection ports to their corresponding one or more connection lines at said intersection points and over said insulation members.

2. The apparatus of claim 1, wherein the sensing electrodes of the multi-channels include sensing electrodes of first and second multi-channels connected to the common connectors, respectively, and the sensing electrodes of the first and second multi-channels are arranged alternately.

3. The apparatus of claim 1, wherein the sensing electrodes of the multi-channels include sensing electrodes of first, second, and third multi-channels connected to the common connectors, respectively, and the sensing electrodes of the first, second and third multi-channels are arranged sequentially.

4. The apparatus of claim 1, wherein the independent channels arranged in the two crossing directions are connected to a transmission end of the control circuit unit for generating a signal to sense the touch of the object and the multi-channels arranged in the one direction are connected to a reception end of the control circuit unit for receiving a signal.

5. The apparatus of claim 1, wherein the sensing electrodes are transparent electrodes.

6. The apparatus of claim 1, wherein the sensing electrodes include a plurality of transparent electrodes and at least one of a metal electrode and a transparent electrode that connects the transparent electrodes.

7. The apparatus of claim 1, wherein an insulated intersection point is formed by insulating an intersection point between the connectors by using at least one of an electrode layer for forming the sensing electrodes of the electrode unit and an insulation layer.

8. A method for driving a position measuring apparatus that measures a position of a touch by an object, on a device including the position measuring apparatus, the position measuring apparatus using an electrode unit comprising an X-axis direction electrode unit and a Y-axis direction electrode unit for sensing a capacitance or voltage variation caused by a touch of the object and a control circuit unit for exchanging electrical signals with the electrode unit, wherein the position touched by the object is measured using sensing electrodes arranged in two crossing directions of the X-axis and the Y-axis, the sensing electrodes arranged in one direction include independent channels and multi-channels, and the sensing electrodes arranged in the other direction perpendicular to the one direction include only independent channels, wherein the independent channels connect a subset of the sensing electrodes independently using independent connectors to the control circuit unit, wherein the multi-channels connect the remainder of the sensing electrodes commonly using common connectors to the control circuit, and wherein the X-axis electrode unit having sensing electrodes arranged in the X-axis direction and the Y-axis electrode unit having sensing electrodes arranged in the Y-axis direction are layered on opposite surfaces with an insulation layer interposed in between, and the method comprising:
    sensing a touch signal of the object on the independent channels connected to the control circuit unit through a corresponding one of the independent connectors;
    selectively driving the multi-channels disposed adjacent to the independent channels and electrically connected to the control circuit through a corresponding one of the common connectors, in response to the touch signal applied on the independent channels; and sensing the touch signal of the object using the multi-channels.

9. The method of claim 8, wherein if a length of the object touching the electrode unit is greater than the distance between a sensing electrode for one of the independent channels and a sensing electrode for another one of the independent channels immediately adjacent to the one of the independent channels, a position touched by the object is determined using only the independent channels, and if the length of the object is less than the distance between a sensing electrode for one of the independent channels and a sensing electrode for another independent channel immediately adjacent to the one of the independent channels, the position touched by the object is determined using both the independent channels and the multi-channels.

* * * * *